United States Patent
Matsushita et al.

(10) Patent No.: US 10,055,822 B2
(45) Date of Patent: Aug. 21, 2018

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Masahiro Matsushita, Yokohama (JP); Hirotaka Shiiyama, Yokohama (JP); Hideki Sorakado, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 15/298,850

(22) Filed: Oct. 20, 2016

(65) Prior Publication Data
US 2017/0116714 A1 Apr. 27, 2017

(30) Foreign Application Priority Data

Oct. 22, 2015 (JP) ................ 2015-208287

(51) Int. Cl.
| H04N 9/00 | (2006.01) |
| G06T 5/00 | (2006.01) |
| G06K 9/46 | (2006.01) |
| H04N 5/247 | (2006.01) |
| H04N 1/60 | (2006.01) |
| H04N 9/64 | (2006.01) |
| H04N 9/73 | (2006.01) |

(52) U.S. Cl.
CPC ............ *G06T 5/003* (2013.01); *G06K 9/4604* (2013.01); *H04N 1/60* (2013.01); *H04N 5/247* (2013.01); *H04N 9/64* (2013.01); *H04N 9/735* (2013.01); *G06T 2207/10024* (2013.01)

(58) Field of Classification Search
CPC ........ G06T 5/003; G06K 9/4604; H04N 1/60; H04N 5/247; H04N 9/64; H04N 9/735
See application file for complete search history.

(56) References Cited

U.S. PATENT DOCUMENTS

| 9,076,064 B2 | 7/2015 | Shiiyama et al. | |
| 2012/0057045 A1* | 3/2012 | Shimizu | H04N 9/735 348/223.1 |

(Continued)

FOREIGN PATENT DOCUMENTS

| JP | 2004-341762 A | 12/2004 |
| JP | 2009-049759 A | 3/2009 |

(Continued)

*Primary Examiner* — Ping Hsieh
(74) *Attorney, Agent, or Firm* — Carter, Deluca, Farrell & Schmidt, LLP

(57) ABSTRACT

A tint of an object according to a second image capturing device is corrected by a first parameter for correcting a tint of a second object that the second image capturing device captured in a first time zone to a tint of a first object that a first image capturing device captured in a first time zone. If a third object captured by a third image capturing device corresponds to the first object, a parameter for correcting a tint of the third object to the tint of the first object is used for correcting a tint of an object according to a third image capturing device. If the third object corresponds to the second object, the first parameter and a third parameter for correcting the tint of the third object to the tint of the second object is used for the foregoing tint correction.

11 Claims, 7 Drawing Sheets

(56) References Cited

U.S. PATENT DOCUMENTS

| | | | | |
|---|---|---|---|---|
| 2012/0169842 A1* | 7/2012 | Chuang | ............ | G08B 13/19619 |
| | | | | 348/39 |
| 2015/0294187 A1 | 10/2015 | Sorakado et al. | | |
| 2015/0379368 A1 | 12/2015 | Shiiyama et al. | | |
| 2016/0021298 A1* | 1/2016 | Tsutsumi | ................ | G06T 7/593 |
| | | | | 348/349 |
| 2016/0284092 A1 | 9/2016 | Matsushita et al. | | |

FOREIGN PATENT DOCUMENTS

| | | |
|---|---|---|
| JP | 2009-055443 A | 3/2009 |
| JP | 4715527 B2 | 7/2011 |

\* cited by examiner

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention is something that relates to a technique for correcting of an image.

Description of the Related Art

Conventionally, a system that searches for objects (such as a person for example) captured in a video obtained from a plurality of cameras is known (Japanese Patent Laid-Open No. 2009-55443). In the case of searching for objects in video according to a plurality of cameras, there are tints that do not match even though it is the same object due to ambient light, illumination or the like, and this causes precision of matching of objects to be reduced.

In Japanese Patent Laid-Open No. 2009-55443, a color correction parameter for matching tints between the plurality of cameras is generated in advance, and deterioration of matching precision is prevented by performing matching of the objects after color correction.

In Japanese Patent Laid-Open No. 2004-341762, a method for obtaining a color space of image data whose color space is unclear is disclosed. More specifically, a reference color in a reference color space of an object is stored in a database in advance. Also, an object within image data is identified, several color spaces are assumed, and a tint of the object is converted to a reference color space. When a deviation between the reference color and the tint of the object is small enough to be tolerable, the color space is output.

However, in Japanese Patent Laid-Open No. 2009-55443, it is necessary that the color correction parameter be obtained in advance for the plurality of cameras, and this cannot handle an environment (ambient light for example) that changes in accordance with the passing of time. In Japanese Patent Laid-Open No. 2004-341762, it is necessary that the color space, the reference color, and the like be prepared in advance for each object, and targets for which color matching is possible are limited.

SUMMARY OF THE INVENTION

The present invention was conceived in view of these kinds of problems, and provides a technique for correcting an object within an image to an object for which influence due to an environment change in accordance with the passing of time, in addition to a difference of viewing conditions between cameras, is reduced.

According to the first aspect of the present invention, there is provided an image processing apparatus, comprising: a first correction unit configured to use a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and a second correction unit configured to use, if a third object that a third image capturing device captured in a third time zone after the second time zone corresponds to the first object, a second parameter for correcting a tint of the third object to the tint of the first object that the first image capturing device captured in the first time zone, and to use, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

According to the second aspect of the present invention, there is provided an image processing method that an image processing apparatus performs, the method comprising: using a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and using, if a third object that a third image capturing device captured in a third time zone after the second time zone corresponds to the first object, a second parameter for correcting a tint of the third object to the tint of the first object that the first image capturing device captured in the first time zone, and using, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

According to the third aspect of the present invention, there is provided a non-transitory computer-readable storage medium storing a computer program for causing a computer to function as a first correction unit configured to use a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and a second correction unit configured to use, if a third object that a third image capturing device captured in a third time zone after the second time zone corresponds to the first object, a second parameter for correcting a tint of the third object to the tint of the first object that the first image capturing device captured in the first time zone, and to use, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

Further features of the present invention will become apparent from the following description of exemplary embodiments (with reference to the attached drawings).

DESCRIPTION OF THE EMBODIMENTS

Below, explanation will be given for embodiments of present invention with reference to the accompanying drawings. Note that embodiments described below merely illustrate examples of specifically implementing the present invention, and are only specific embodiments of a configuration defined in the scope of the claims.

First Embodiment

Below, description is given regarding an example of an image processing apparatus having the subsequent configuration. Specifically, a first parameter for correcting a tint of a second object that a second image capturing device captured in a first time zone to a tint of a first object that a first image capturing device that is a reference captured in the first time zone is used to correct a tint of an object that the second image capturing device captured in a second time zone after the first time zone (first correction). Also, if a third object that a third image capturing device captured in a third time zone after the second time zone corresponds to the first object, a second parameter for correcting a tint of the third object to the tint of the first object that the first image capturing device captured in the first time zone, and, if the third object corresponds to the second object, the first parameter and a third parameter for correcting the tint of the third object to the tint of the second object that the second image capturing device captured in the first time zone are used to correct a tint of an object that the third image capturing device captured in a fourth time zone after the third time zone (second correction).

Figure 1:
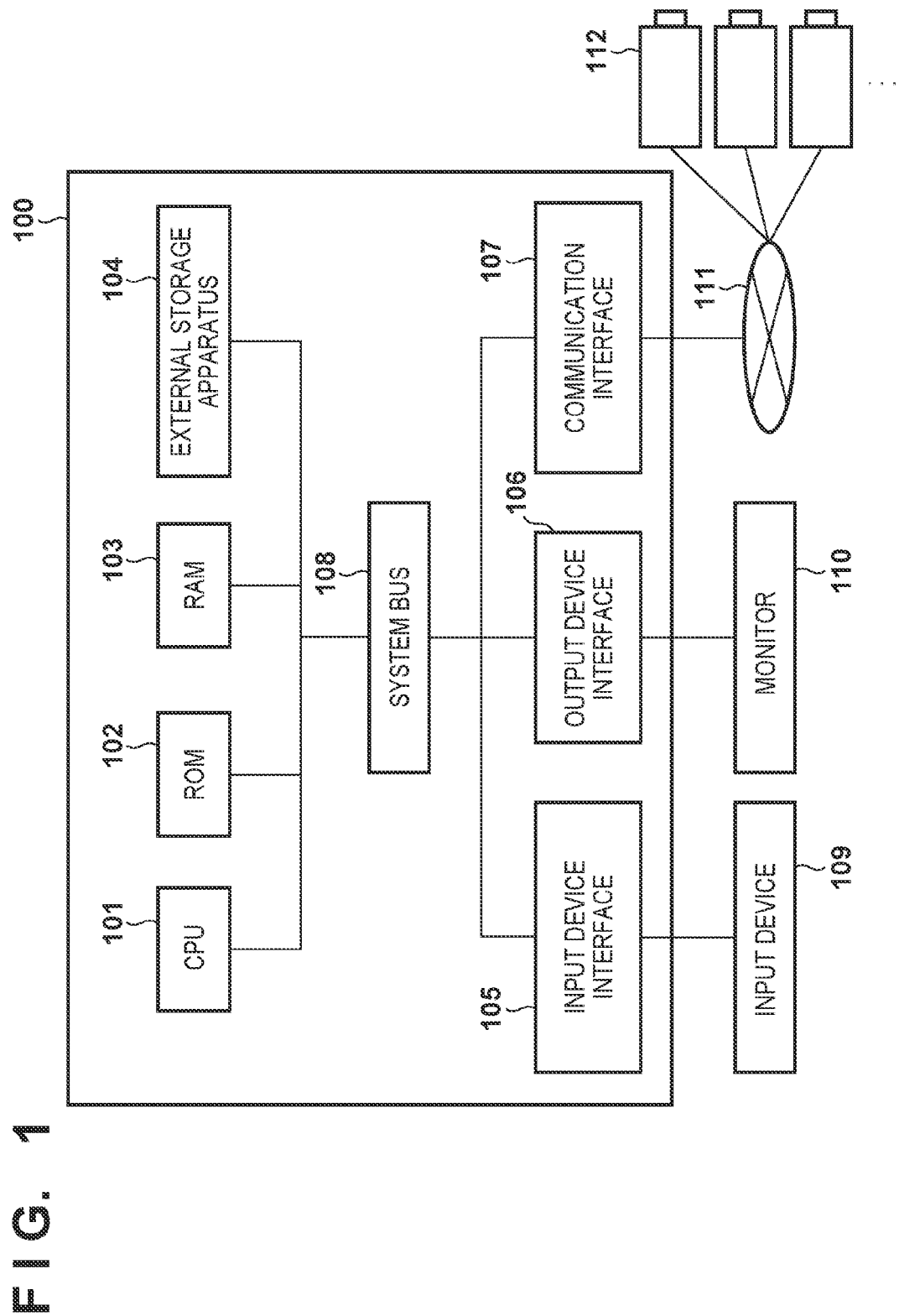
FIG. 1 is a block diagram illustrating an example configuration of a system.

Firstly, a description will be given regarding an example configuration of a system according to embodiments using a block diagram of FIG. 1. As illustrated in FIG. 1, the system according to embodiments has an image processing apparatus 100 which is a PC (personal computer) or the like, peripheral devices (an input device 109 and a monitor 110), and a plurality of network cameras 112. Also, the image processing apparatus 100 and the plurality of network cameras 112 are connected to a network line 111 of a LAN, the Internet, or the like, and are configured such that mutual data communication is possible via the network line 111. Note, the configuration of the system illustrated in FIG. 1 is only one example, and any configuration may be used if the configuration realizes an equivalent or exceeding function. For example, the function of the image processing apparatus 100 may be distributed across a plurality of computers, and the function of the image processing apparatus 100 realized by each of the computers performing collaborative operation.

Firstly, description will be given regarding the image processing apparatus 100.

A CPU 101 executes or controls each process described later as something that the image processing apparatus 100 performs in addition to performing operation control of the image processing apparatus 100 on the whole by using computer programs and data stored in a ROM 102 or a RAM 103 to execute the process.

Setting data, a boot program, and the like of the image processing apparatus 100 are stored in the ROM 102.

The RAM 103 has an area for storing computer programs and data loaded from an external storage apparatus 104, captured images received from each of the plurality of network cameras 112 via a communication interface 107, and the like. Furthermore, the RAM 103 has a work area that is used when the CPU 101 executes various processing. In this way, the RAM 103 can appropriately provide various areas.

The external storage apparatus 104 is a large capacity information storage device represented by a hard disk drive device. In the external storage apparatus 104, an OS (operating system) and driver software corresponding to each of the plurality of network cameras 112 is stored. Also, in the external storage apparatus 104, computer programs and data for causing the CPU 101 to execute or control each process described later as something the image processing apparatus 100 performs are also stored. Computer programs and data stored in the external storage apparatus 104 are loaded to the RAM 103 as appropriate in accordance with control by the CPU 101, and they become targets of processing by the CPU 101.

Note, the external storage apparatus 104 may include an optical disc such as a flexible disk (FD), Compact Disc, or the like, a magnetic or optical card, an IC card, or a memory card that can be attached/removed from the image processing apparatus 100.

An input device interface 105 is something that functions as an interface for connecting the input device 109 to the image processing apparatus 100. The input device 109 is configured by a keyboard, a mouse, or the like, and inputting various instructions to the CPU 101 is possible by operations of the operator of the image processing apparatus 100.

An output device interface 106 is something that functions as an interface for connecting the monitor 110 to the image processing apparatus 100. Note, the output device interface 106 may include an interface for connecting another output device (such as a printer) to the image processing apparatus 100 replacing or adding to the monitor 110. The monitor 110 is configured by a CRT, a liquid crystal screen, or the like, and can display a result of processing by the CPU 101 using images, text or the like.

The communication interface 107 is something that functions as an interface for connecting the image processing apparatus 100 to the network line 111. The image processing apparatus 100 performs data communication with the plurality of network cameras 112 connected to the network line 111 via the communication interface 107.

All of the CPU 101, the ROM 102, the RAM 103, the external storage apparatus 104, the input device interface 105, the output device interface 106, and the communication interface 107 are connected to a system bus 108.

Next, description will be given regarding each of the plurality of network cameras 112. Each of the plurality of network cameras 112 are arranged in appropriate positions, and video (moving images) of a space that entered a field of vision is captured. The videos (a captured image for each frame) that the plurality of network cameras 112 captured are sent to the image processing apparatus 100 via the network line 111. Hereinafter, a base number of the network cameras 112 is made to be N (N is a natural number above 2).

The system according to embodiments is something that searches for an object similar to a query image out of each of the objects included in images captured by the plurality of network cameras 112 and presents it to a user. More specifically, when the image processing apparatus 100 obtains the images captured from each of the plurality of network cameras 112, objects (object images) from the captured images are extracted and stored. Also, the image processing apparatus 100 presents to the user an object that is searched for when the query image is input to the image processing apparatus 100, such as when an object that is similar to the query image is searched for among the group of objects that are stored and displayed on the monitor 110.

Here, as described above, the tint of video according to each of the plurality of network cameras 112 changes in accordance with an attitude or an installation position of the network cameras 112. Also, because changes in the direction of sunlight and the tint or the intensity of ambient light arise and the weather changes along with the passage of time, the tint of the video changes along with the passage of time, even if the image is according to the same network cameras 112.

Here, video of differing tints arises due to either a difference of viewing conditions between the network cameras 112 or a difference of viewing conditions due to the passage of time, and as a result, objects of differing tints are extracted.

Accordingly, in the present embodiment, the tint of each object extracted from the image group captured by the plurality of network cameras 112 is corrected to the tint of the object that a reference network camera captured at a reference timing. Because of this, a difference of the tints of the objects between the network cameras and a difference of the tints of the objects in the time direction are reduced.

Hereinafter, a correction parameter for correcting the tint is generated at regular intervals, and until the next generation, the correction parameter currently generated, and in some cases a correction parameter generated in the past, is used to correct the tint of the object according to each network camera. Note, the timing of generation of the correction parameters is not limited to regular intervals, and may be irregular intervals, but regular intervals will be used in order to simplify the explanation hereinafter.

More specifically, in a reference generation period among correction parameter generation periods arranged at regular intervals (reference time zone: an initial generation period for example), a correction parameter for correcting the tint of the objects captured by each of the plurality of network cameras 112 to a tint of an object that the reference network camera (the reference among the plurality of network cameras 112) captured is obtained. Also, up until the next generation of a correction parameter from the reference time zone, the tint of an object within an image captured by each of the plurality of network cameras 112 is corrected using the correction parameter and the result is output. Because of this, any object captured by each of the plurality of network cameras 112 in the reference time zone is output at approximately the same tint as an object according to the reference network camera.

Also, in a correction parameter generation period after the reference time zone (a quasi-reference time zone), because it is insufficient to correct the tint of an object that the plurality of network cameras 112 captured to the tint of an object that the reference network camera captured in the reference time zone using only a correction parameter generated in the past, an amount by which the correction parameter is insufficient is obtained. Then, up until the next generation of a correction parameter, the tint of an object within images captured by each of the plurality of network cameras 112 is corrected using a correction parameter generated in the past and a correction parameter generated this time, and the object is outputted. Because of this, any object captured by each of the plurality of network cameras 112 in a quasi-reference time zone is outputted at approximately the same tint as an object that the reference network camera captured in the reference time zone.

Here, the above described "correction parameter generation period" is for example, something that can be repeatedly arranged at regular intervals or irregular intervals of particular lengths of time, such as "every 0 to 10 minutes".

Figure 2:
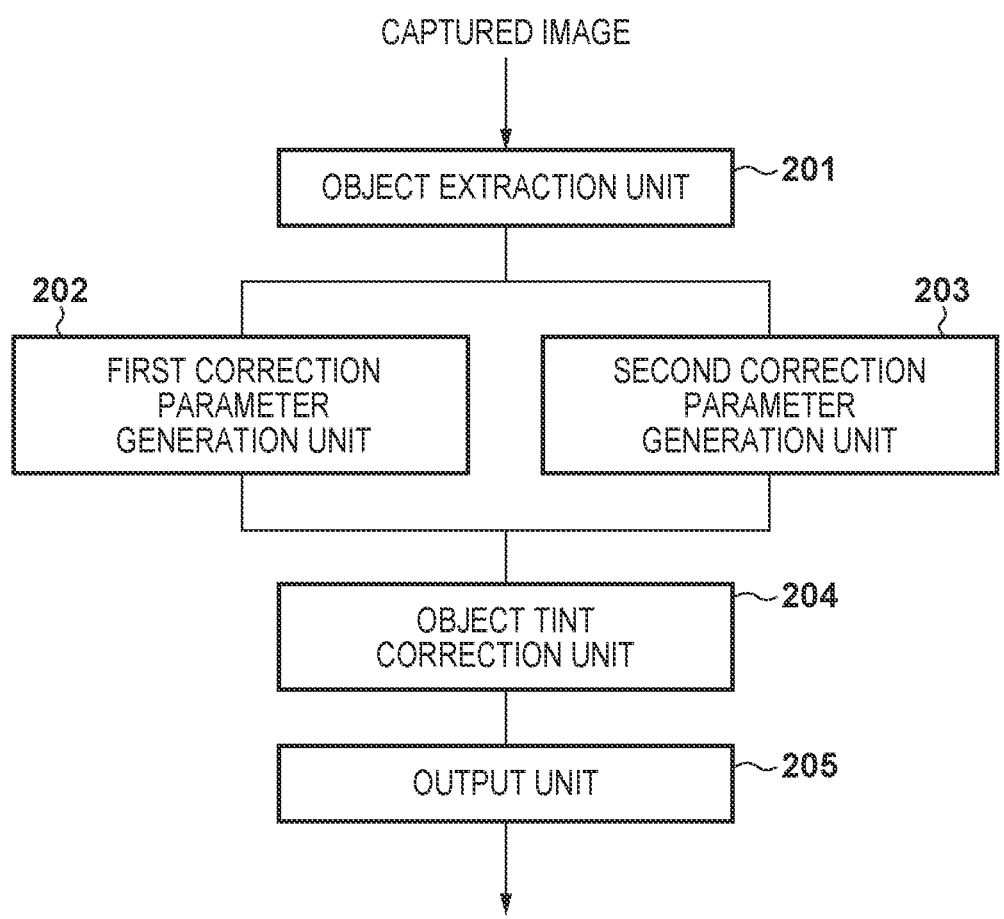
FIG. 2 is a block diagram illustrating a functional configuration example of an image processing apparatus 100.

Next, description will be given regarding the functional configuration example of the image processing apparatus 100 using a block diagram of FIG. 2. Note, although each functional unit illustrated in FIG. 2 may be configured by hardware, each of these functional units will be described as something that is implemented by a computer program in the present embodiment. Note that hereinafter, although there are cases in which the functional units of FIG. 2 are described as the agent of the processing, in actuality, functions corresponding to the functional units are realized by the CPU 101 executing a computer program corresponding to the respective functional unit.

The videos (captured images for each frame) that the plurality of network cameras 112 capture are stored in the external storage apparatus 104 via the communication interface 107. In the captured images, image capture date information indicating the image capture date-time of the captured image, unique identification information for the network cameras that captured the captured images, and the like are attached. An object extraction unit 201 reads each captured image from the external storage apparatus 104, and extracts objects (object image) from each captured image that is read.

A first correction parameter generation unit 202 generates a correction parameter for correcting the tint of an object that the object extraction unit 201 extracted from a captured image group (a group of captured images to which image capture date information indicating an image capture date-time falling in the reference time zone is attached) of the reference time zone to the tint of an object that a network camera 112 (absolute reference camera) that is a reference among the plurality of network cameras 112 captured in the reference time zone.

A second correction parameter generation unit 203 generates the above described amount by which the correction parameter is insufficient for correcting the tint of an object that the object extraction unit 201 extracted from a captured image group of a quasi-reference time zone to the tint of an object that the absolute reference camera captured in the reference time zone.

An object tint correction unit 204 uses the correction parameter that the first correction parameter generation unit 202 generated to correct the tint of objects that the object extraction unit 201 extracts from "the group of captured images of the time zone between the reference time zone and the timing at which the quasi-reference time zone ends". Meanwhile, the object tint correction unit 204 corrects the tint of objects that the object extraction unit 201 extracts from a captured image group of "a group of captured images of the time zone within the timing at which a quasi-reference time zone ends" as follows. Specifically, the correction parameter that the first correction parameter generation unit 202 generated and the correction parameter that the second correction parameter generation unit 203 generated are used for the correction.

An output unit 205 stores each object whose tint the object tint correction unit 204 corrected to the external storage apparatus 104.

Figure 3:
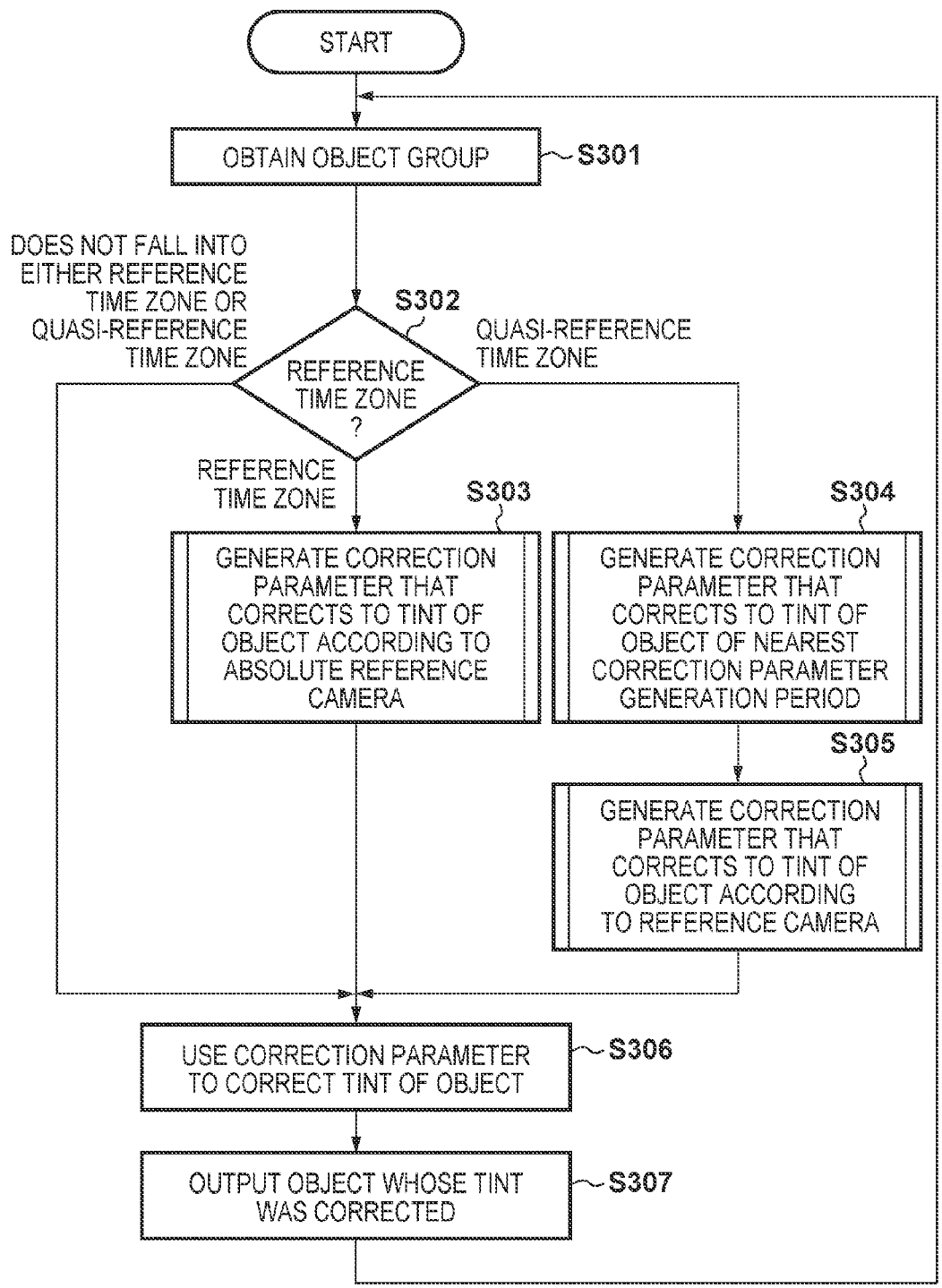
FIG. 3 is a flowchart of processing that the image processing apparatus 100 performs.

Next, processing for outputting after correcting the tint of an object within a video according to the plurality of network cameras 112 so as to reduce differences of viewing conditions between the network cameras and differences of tint due to the passing of time will be described using the flowchart of FIG. 3.

<Step S301>

The object extraction unit 201 extracts objects from each captured image stored in the external storage apparatus 104. Note, the object extraction unit 201 assigns unique identification numbers to the extracted objects and assigns the same identification number to identical objects. Also, in the case of extracting objects from the captured images, although all objects within the captured image may be extracted, configuration may also be such that a predetermined object is extracted.

<Step S302>

The CPU 101 references the current date-time, which a timer (not shown) that it manages measures, to determine whether the referenced current date-time is a timing at which the reference time zone starts, is a timing at which a quasi-reference time zone starts, or falls into neither of the reference time zone nor a quasi-reference time zone. In a case in which the result of this determination is that the current date-time is the timing of the start of the reference time zone, the processing proceeds to step S303, and in a case in which it is the timing of the start of a quasi-reference time zone, the processing proceeds to step S304. Meanwhile, if it falls neither in the reference time zone nor a quasi-reference time zone, the processing proceeds to step S306.

Note that if there is a function in which the network cameras 112 perform a tint adjustment such as white balancing or the like, a vicinity of a timing at which a tint adjustment value for the white balancing exceeds a predetermined value may be made to be the timing at which to start a correction parameter generation period.

In this way, "correction parameter generation period" is a time zone set or arranged as a period in which tint correction is performed to cause a reduction in an influence of a change of viewing conditions accompanying the passage of time or a difference of viewing conditions between the cameras on an object.

<Step S303>

Firstly, the first correction parameter generation unit 202 sets one of the plurality of network cameras 112 to be the absolute reference camera. Then, the first correction parameter generation unit 202 generates a correction parameter for correcting the tint of an object that a non-absolute reference camera captured to the tint of an object that the absolute reference camera captured. Details of the processing in step S303 will be described later using the flowchart of FIG. 4.

<Step S304>

The second correction parameter generation unit 203 divides the plurality of network cameras 112 into units of "groups of network cameras that captured a common object". Then, the second correction parameter generation unit 203, for each group, generates a correction parameter for correcting the tint of an object captured by a reference camera that falls under the group to the tint of the object captured in the nearest correction parameter generation period. Details of the processing in step S304 will be described later using the flowchart of FIG. 5.

<Step S305>

The second correction parameter generation unit 203, in each group divided in step S304, performs the following processing. Specifically, a correction parameter is generated for correcting the tint of an object captured by a non-reference camera among the cameras falling under that group to the tint of the object captured by a reference camera falling under the group. Details of the processing in step S305 will be described later using the flowchart of FIG. 6.

<Step S306>

If the processing transitions from step S303 to step S306, the object tint correction unit 204 uses the correction parameter obtained in step S303 to correct the tint of objects extracted from captured images of image capture date-times from the reference time zone. Meanwhile, if the processing transitions from step S305 to step S306, the object tint correction unit 204 uses a combined correction parameter obtained by combining the correction parameter obtained in step S304 and the correction parameter obtained in step S305, or a combined correction parameter obtained by combining a correction parameter obtained in step S303, the correction parameter obtained in step S304, and the correction parameter obtained in step S305 to correct the tint of an object extracted from a captured image of an image capture date-time from the quasi-reference time zone.

<Step S307>

The output unit 205 outputs the object whose tint was corrected in step S306, in other words, the object used as a matching target in an object search using a query, to an appropriate output destination such as the external storage apparatus 104, or the like. After step S307, the processing transitions to step S301, and the processing from step S301 is performed.

Next, details of the processing in the foregoing step S303 will be described using the flowchart of FIG. 4.

<Step S401>

Firstly, the first correction parameter generation unit 202 sets one of the plurality of network cameras 112 to be the absolute reference camera. There are various methods regarding which of the network cameras 112 among the plurality of network cameras 112 is made to be the absolute reference camera, but limitation is not made to any method. For example, the network camera 112 with the best viewing conditions of an object (for example, the network camera 112 that is under viewing conditions capable of capturing a captured image of an appropriate luminance) may be made to be the absolute reference camera.

Next, the first correction parameter generation unit 202 selects one unselected camera among the respective non-absolute reference cameras as a selected camera. Then, the first correction parameter generation unit 202 determines whether or not some or all of the objects that the absolute reference camera captured in the reference time zone are included within the objects that the selected camera captured in the reference time zone. In this determination, a similarity between each object that the selected camera captured and each object that the absolute reference camera captured is obtained. For the similarity, a similarity of a feature amount of the object is used. As the feature amount, "a feature amount for which the dependence level on color is low" is assumed to be used, and for example, SIFT (Scale Invariant Feature Transform) is used. A feature amount of an object is obtained in advance at a time of an extraction of the object, when the captured image is input to the present apparatus, or the like.

Also, if a similarity that is greater than a predetermined value is obtained, an object that is common (common object) between an object captured by the absolute reference camera and an object captured by the selected camera can be determined when more than one exist.

Also, if a common object exists between the selected camera and the absolute reference camera, the first correction parameter generation unit 202 generates a correction parameter P1 for correcting the tint of the common object in the selected camera to the tint of the common object in the absolute reference camera. If there are two or more objects in common between the selected camera and the absolute reference camera, one out of these is used. Also, if a similarity that is greater than a predetermined value is not obtained, correction parameter generation is not performed since there is not even one common object between an object captured by the absolute reference camera and an object captured by the selected camera.

<Step S402>

The CPU 101 determines whether or not all non-absolute reference cameras have been selected as the selected cameras in step S401. In a case when the result of this determination is that all non-absolute reference cameras have been selected as the selected camera, the processing transitions to step S306. On the other hand, in a case when there still remains a non-absolute reference camera that has not been selected as the selected camera, the processing returns to step S401.

Figure 7:
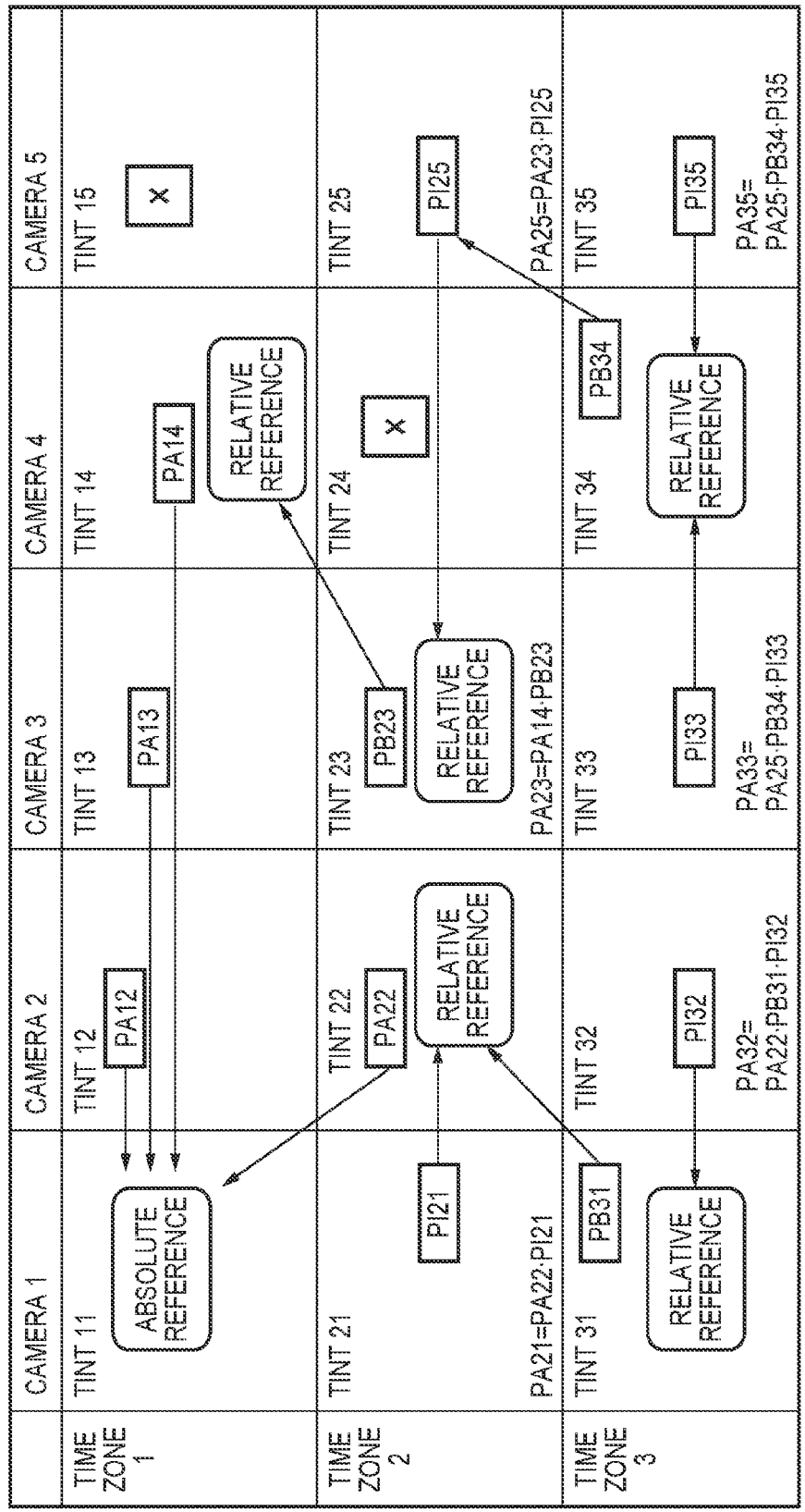
FIG. 7 is a view for illustrating an example of correcting tints between objects.

As illustrated in FIG. 7 for example, in the case of time zone 1 (reference time zone), a case in which there is an object common to camera 1 as the absolute reference camera and cameras 2 through 4 as non-absolute reference cameras, and camera 5 as a non-absolute reference camera does not capture any object that camera 1 captured is assumed. In such a case, a correction parameter PA 12 is generated for correcting a tint 12 of the object according to camera 2 to a tint 11 of the object according to camera 1. Also, a correction parameter PA 13 is generated for correcting a tint 13 of the object according to camera 3 to the tint 11 of the object according to camera 1. Also, a correction parameter PA 14 is generated for correcting a tint 14 of the object according to camera 4 to the tint 11 of the object according to camera 1. Also, configuration is taken such that correction is not made or that by using the default correction parameter set in advance a tint 15 of the object according to camera 5 is corrected.

Figure 4:
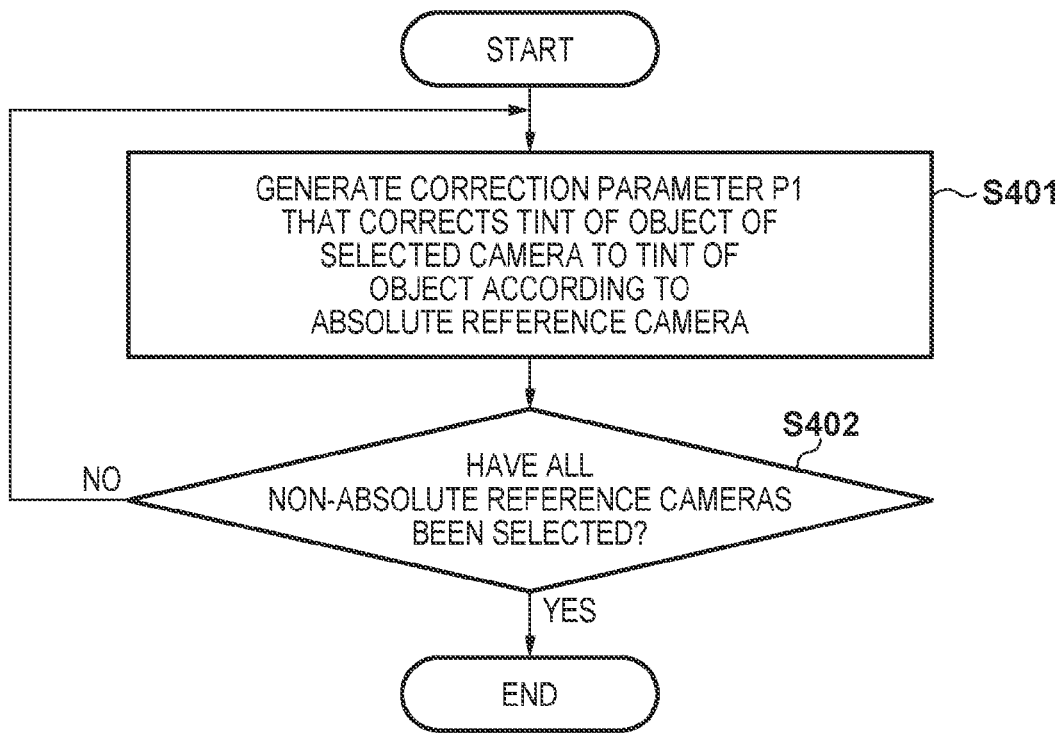
FIG. 4 is a flowchart of processing in step S303.

Note, the processing of step S303, specifically, the processing in accordance with the flowchart of FIG. 4, is the processing in the reference time zone. In other words, the captured image of an object according to the absolute reference camera and the captured image of the object according to a non-absolute reference camera among the group of images captured by the plurality of network cameras 112 within the reference time zone are used to obtain a correction parameter.

Next, details of the processing in the foregoing step S304 will be described using the flowchart of FIG. 5.

<Step S501>

The second correction parameter generation unit 203 selects one unselected camera among the N network cameras 112 cameras as a selected camera. Then, the second correction parameter generation unit 203 determines, regarding the network cameras 112 other than the camera selected among N network cameras 112, whether or not a common object between those network cameras 112 and the selected camera exists. This determination processing is the same as in the above described step S401. Next, the second correction parameter generation unit 203 forms a single group between the selected camera and the network cameras 112 for which there is an object in common with the selected camera.

<Step S502>

The second correction parameter generation unit 203 determines whether or not all N network cameras 112 have been selected in step S501 as selected cameras. In the case when the result of this determination is that all N network cameras 112 have been selected as the selected camera, the processing proceeds to step S503. On the other hand, in the case when a network camera 112 among the N network cameras 112 that has not yet been selected as the selected camera remains, the processing returns to step S501.

<Step S503>

The second correction parameter generation unit 203 selects a single group among the groups formed in step S501 that has not been selected as a selected group. Then, the second correction parameter generation unit 203, for each of the network cameras 112 that falls under the selected group, obtains similarities between the feature amounts of the respective objects that the network cameras 112 captured and the feature amounts of the respective objects in the nearest correction parameter generation period. The feature amount used here is the foregoing "feature amount for which the dependence level on color is low". Also, the "nearest correction parameter generation period", if currently the second quasi-reference time zone, is the reference time zone, and if the third or more quasi-reference time zone, is the quasi-reference time zone of the previous time.

<Step S504>

The second correction parameter generation unit 203 identifies the network camera 112 that obtained the highest level of similarity in step S503 among each network camera 112 falling under the selected group as a group reference camera (reference image capturing device) in the selected group.

<Step S505>

The second correction parameter generation unit 203 generates a correction parameter P2 for correcting the tint of an object for which the highest similarity was obtained in step S503 among the objects that the group reference camera captured to the tint of the object for which the highest similarity was obtained in step S503 among the objects in the nearest correction parameter generation period.

<Step S506>

The second correction parameter generation unit 203 determines whether or not all groups formed in step S501 have been selected as the selected group in step S503. In a case when the result of this determination is that all groups have been selected as selected group, the processing transitions to step S305. Meanwhile, in a case when there still remains a group that has not been selected as the selected group, the processing returns to step S503.

As illustrated in FIG. 7, for example, in a case of the time zone 2 (quasi-reference time zone) which is the correction parameter generation period following the time zone 1, a single group with camera 1 and camera 2 is formed because a common object between camera 1 and camera 2 exists. Also, in the time zone 2, a single group with camera 3 and camera 5 is formed because a common object exists between camera 3 and camera 5. Also, for camera 4 in the time zone 2, a single group of only camera 4 is formed because it has not captured the same object as any other camera.

Also, the object most similar to the object that camera 2 captured in the time zone 2 is captured by camera 1 in the time zone 1, and the object that is most similar to the object that camera 3 captured in time zone 2 is captured by camera 4 in time zone 1.

In such a case, a correction parameter PA 22 is generated for correcting a tint 22 of the object according to camera 2 to the tint 11 of the object according to camera 1. Also, a correction parameter PB 23 is generated for correcting a tint 23 of the object according to camera 3 to a tint 14 of the object according to camera 4.

Also, for example, in a case of the time zone 3 (quasi-reference time zone) which is the correction parameter generation period following the time zone 2, a single group with camera 1 and camera 2 is formed because a common object between camera 1 and camera 2 exists. Also, in the time zone 3, a single group with camera 3, camera 4, and camera 5 is formed because a common object exists between camera 3, camera 4, and camera 5.

Also, the object most similar to the object that camera 1 captured in the time zone 3 is captured by camera 2 in the time zone 2, and the object that is most similar to the object that camera 4 captured in time zone 3 is captured by camera 5 in time zone 2.

In such a case, a correction parameter PB 31 is generated for correcting the tint 22 of the object according to camera 2 to a tint 31 of the object according to camera 1. Also, a correction parameter PB 34 is generated for correcting a tint 34 of the object according to camera 4 to a tint 25 of the object according to camera 5.

Next, details of the processing in the foregoing step S305 will be described using the flowchart of FIG. 6.

<Step S601>

The second correction parameter generation unit 203 selects a group among the groups formed in step S501 that has not been selected as a selected group. Then, the second correction parameter generation unit 203 generates a correction parameter P3 for correcting the tint of an common object for the cameras that are not the group reference camera in the selected group to the tint of the common object for the group reference camera in the selected group.

<Step S602>

The second correction parameter generation unit 203 determines whether or not all groups formed in step S501 have been selected as the selected group in step S601. In a case when the result of this determination is that all groups have been selected as the selected group, the processing transitions to step S306. Meanwhile, in a case when there still remains a group that has not been selected as the selected group, the processing returns to step S601.

As illustrated in FIG. 7, for example, in the case of the time zone 2 (quasi-reference time zone) which is the correction parameter generation period following the time zone 1, a correction parameter PI 21 for correcting the tint 21 of an object according to camera 1 to the tint 22 of an object according to camera 2 is generated. Also, a correction parameter PI 25 is generated for correcting the tint 25 of the object according to camera 5 to the tint 23 of the object according to camera 3.

By generating the correction parameter as described above, the tint 11 can be obtained by correcting the tint 22 by the correction parameter PA 22 for example. Also, the tint 14 can be obtained by correcting the tint 23 by the correction parameter PB 23, and the tint 11 can be obtained by correcting the tint 14 by the correction parameter PA 14. Also, the tint 21 can be obtained by correcting the tint 22 by the correction parameter PI 21, and the tint 11 can be obtained by correcting the tint 22 by the correction parameter PA 22. Also, the tint 23 can be obtained by correcting the tint 25 by the correction parameter PI 25, the tint 14 can be obtained by correcting the tint 23 by the correction parameter PB 23, and the tint 11 can be obtained by correcting the tint 14 by the correction parameter PA 14.

Also, in the case of the time zone 3 (quasi-reference time zone), a correction parameter PI 32 is generated for correcting a tint 32 of the object according to camera 2 to the tint 31 of the object according to camera 1. Also, a correction parameter PI 33 is generated for correcting a tint 33 of the object according to camera 3 to a tint 34 of the object according to camera 4. Also, a correction parameter PI 35 is generated for correcting a tint 35 of the object according to camera 5 to a tint 34 of the object according to camera 4.

By generating the correction parameter as described above, the tint 22 can be obtained by correcting the tint 31 by the correction parameter PB 31, for example, and the tint 11 can be obtained by correcting the tint 22 by the correction parameter PA 22.

Also, the tint 32 can be obtained by correcting the tint 31 by the correction parameter PI 32, the tint 22 can be obtained by correcting the tint 31 by the correction parameter PB 31, and the tint 11 can be obtained by correcting the tint 22 by the correction parameter PA 22.

Also, the tint 33 can be obtained by correcting the tint 34 by the correction parameter PI 33, the tint 25 can be obtained by correcting the tint 34 by the correction parameter PB 34, and the tint 11 can be obtained by correcting the tint 25 by a correction parameter PA 25.

Also, the tint 25 can be obtained by correcting the tint 34 by the correction parameter PB 34, and the tint 11 can be obtained by correcting the tint 25 by the correction parameter PA 25.

Also, the tint 34 can be obtained by correcting the tint 35 by the correction parameter PI 35, the tint 25 can be obtained by correcting the tint 34 by the correction parameter PB 34, and the tint 11 can be obtained by correcting the tint 25 by the correction parameter PA 25.

In this way, in the time zone 3, the correction parameters PB 31, PI 32, PI 33, PB 34, and PI 35 obtained in the time zone 3 and the correction parameters obtained in the correction parameter generation periods prior to time zone 3 are used to obtain the tint 11. Similarly, in time zone 4 and onward, the correction parameters currently obtained and correction parameters obtained in the past are used to obtain the tint 11.

In this way, even between differing cameras, and even across differing time zones, the tints can be caused to be unified to the tint of the object captured by the absolute reference camera in the reference time zone.

In step S306, the correction parameters generated in step S303 are used to correct the tint of the object in the reference time zone.

Also, for the tint of an object according to a group reference camera in a quasi-reference time zone, correction is performed using the correction parameter P2, and a correction parameter obtained in the past for correcting a tint of an object of a tint conversion target according to the correction parameter P2 to a tint of an absolute reference camera. Also, for the tint of an object according to a camera that is not a group reference camera in a quasi-reference time zone, correction is performed using the correction parameters P2 and P3, and a correction parameter obtained in the past for correcting a tint of an object of a tint conversion target according to the correction parameter P2 to a tint of an absolute reference camera.

Note that if a correction parameter PA 21 obtained by combining the correction parameter PA 22 and the correction parameter PI 21 is created, it is possible to obtain the tint 11 by the correction parameter PA 21 alone from the tint 21. Also, if a correction parameter PA 23 obtained by combining the correction parameter PB 23 and the correction parameter PA 14 is created, it is possible to obtain the tint 11 by the correction parameter PA 23 alone from the tint 23. Also, if the correction parameter PA 25 obtained by combining the correction parameter PI 25 and the correction parameter PA 23 is created, it is possible to obtain the tint 11 by the correction parameter PA 25 alone from the tint 25. The same is true for PA32, PA33, and PA35 of time zone 3. There are various methods to perform this combination of correction parameters, and for example, if the correction parameter is a look-up table, there is a method in which something that connects the output of one look-up table to the input of another look-up table to make the combined correction parameter. In such a case, by inputting the tint of an object on the input side of one look-up table, a corrected tint is output from the output side of another look-up table. Also, if the correction parameter is a color correction matrix, there is a method of making the product of respective correction matrices the combined correction parameter.

When generation of correction parameters by the first correction parameter generation unit 202 and the second correction parameter generation unit 203 completes, for example, the object tint correction unit 204 generates such a combined correction parameter using these correction parameters. In step S306, any form may be taken with respect to whether to convert tints using several correction parameters or to correct tints using a combined correction parameter obtained by combining several correction parameters in this embodiment.

Also, configuration is taken such that correction is not made or correction is performed using the default correction parameter set in advance for a tint 24 of the object according to camera 4 in the time zone 2. After time zone 3, tints are unified to the tint of the absolute reference camera similarly to time zone 2.

Figure 5:
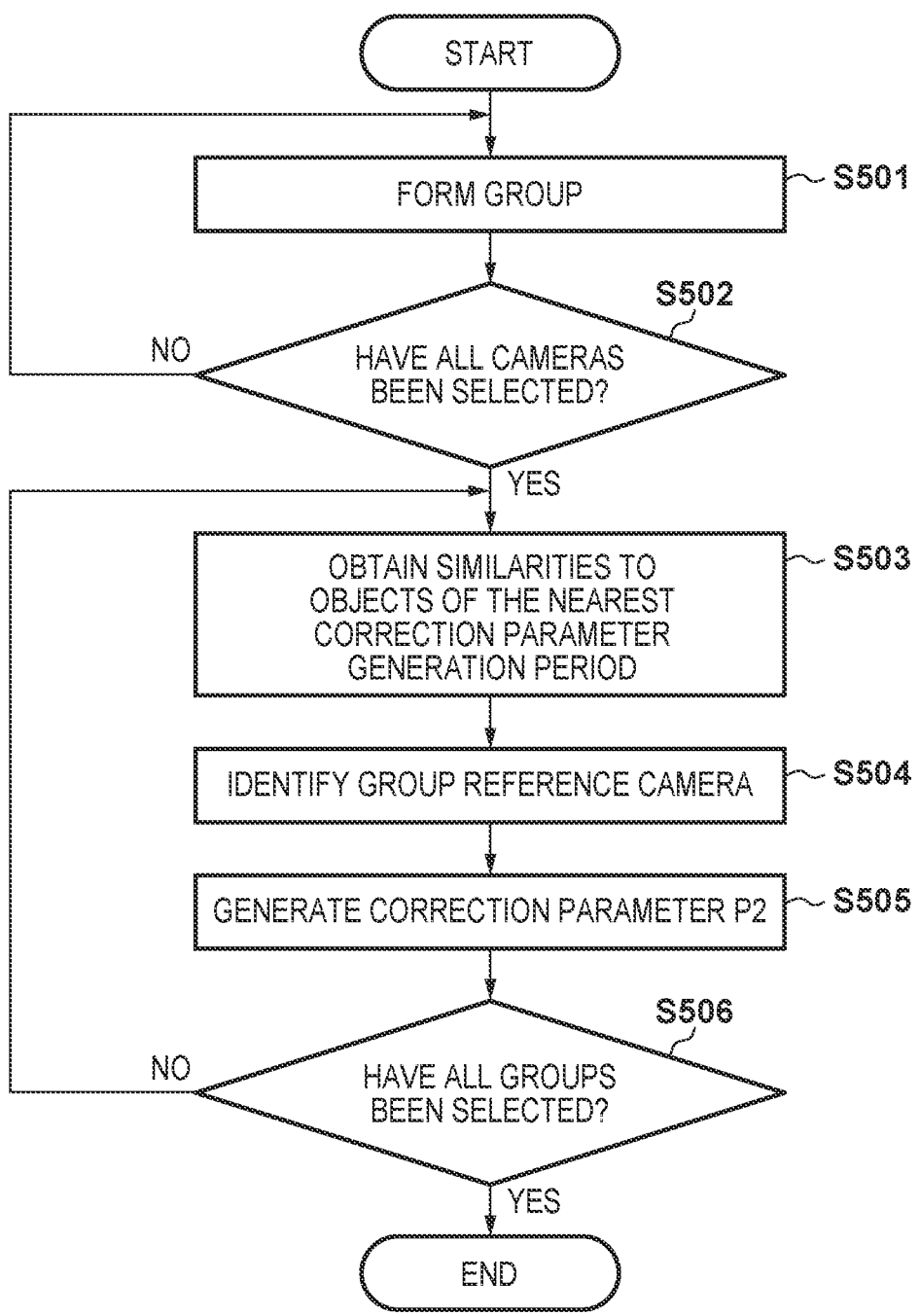
FIG. 5 is a flowchart of processing in step S304.
Figure 6:
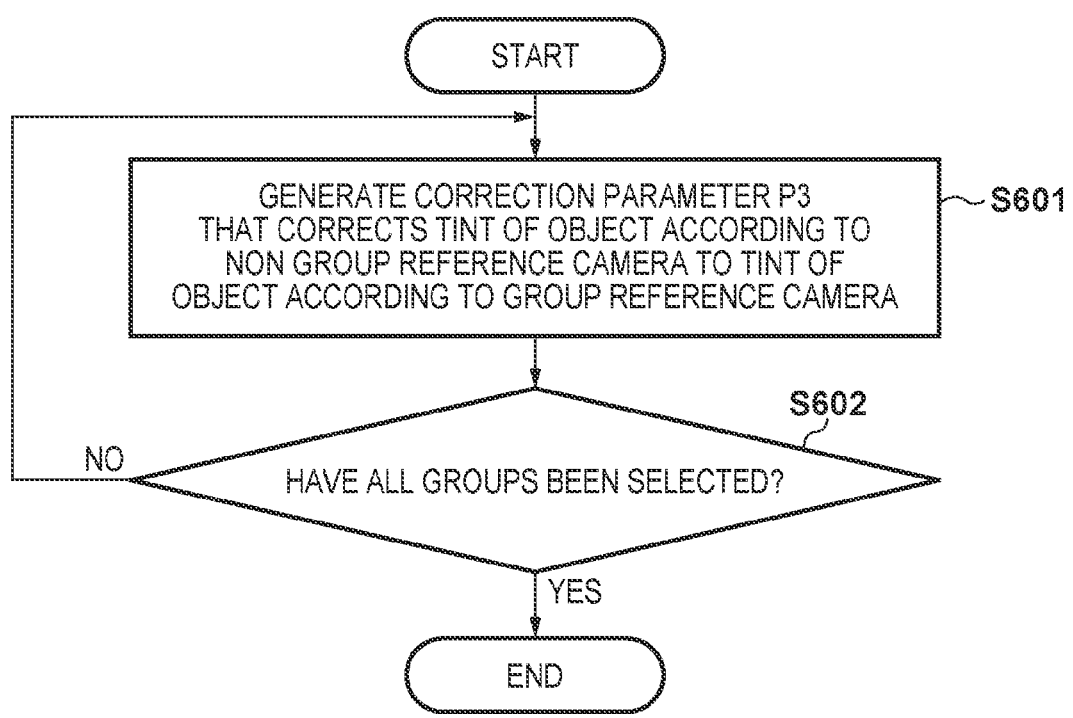
FIG. 6 is a flowchart of processing in step S305.

Note, the processing of step S304 and step S305, specifically, the processing in accordance with the flowchart of FIGS. 5 and 6, is the processing in a quasi-reference time zone. In other words, the captured images of common objects for each group among the captured image groups captured by the plurality of network cameras 112 in the quasi-reference time zone are used to obtain the correction parameter.

By the processing in accordance with the flowcharts of FIGS. 3-6 as described above, objects having a tint that excludes influence due to differences in viewing conditions between cameras and changes in viewing conditions according to the passing of time are registered in the external storage apparatus 104. Here it is possible to reduce as much as possible the possibility that an object will be identified as different if the object is the same due to differences in viewing conditions between cameras, and the influence of changes in viewing conditions according to the passing of time.

Note that in the foregoing example, objects are registered in the external storage apparatus 104 after correction of their tint using correction parameters, but the timing of the correction is not limited to being prior to registration. Configuration may be taken so as to register objects in the external storage apparatus 104 in association with corresponding correction parameters without correcting the tint, for example. In such a case, configuration may also be taken such that a query image matching of an object is performed after correction using correction parameters associated with the object upon an object search that uses the query image. In such a matching, various feature amounts may be used rather than "a feature amount for which the dependence level on color is low". These "various feature amounts" are feature amounts extracted from an object whose tint is corrected.

Note that correction parameter generation methods are well known. Therefore, parameters are generated such that the tint of a skin region in a face region of one person approaches the tint of a skin region in a face region of another person in a case where the object is a person, for example, though this was not touched upon in particular detail above.

Also, there is the following method of calculating correction parameters and generating a color corrected image using them. For example, as is recited in Japanese Patent Laid-Open No. 2009-49759, it is possible to obtain a plurality of corresponding points in objects and to configure a look-up table from differences in color between these corresponding points, and to make such a look-up table be the correction parameters. Also, color correction is achieved by replacing with a different color by referring to the look-up table for each pixel of an input image in color correction that uses such correction parameters.

Alternatively, as is recited in Japanese Patent No. 4715527, a color correction matrix may be obtained and the color correction matrix made to be the correction parameters. Also, different colors are replaced by applying the color correction matrix for each input image pixel in color correction that uses such a color correction matrix.

Furthermore, cases where the feature amounts that are used have color information itself such as skin color, clothing color, and hair color are cases in which it is possible to correct the feature amounts without correcting the image itself.

Configuration may also be taken such that in cases where none of the similarities obtained in step S503 exceed a predetermined threshold, similarities between the feature amounts of the respective objects in a correction parameter generation period that is one older than the nearest correction parameter generation period are further obtained in step S503. In this way, configuration may also be taken such that in the case where none of the similarities between the feature amounts of the respective objects in the past correction parameter generation period exceed the predetermined threshold, similarities between feature amounts of respective objects in an even older correction parameter generation period are obtained.

Second Embodiment

In the first embodiment, an objective of correcting the tint of objects (objective of obtaining the correction parameters) is to increase the precision of an object search based on a query image. However, the objective of correcting the tint of objects is not limited to this.

For example, when displaying a list of objects, the foregoing correction parameters may be used to perform display after aligning tints of the respective objects. Such list displayed objects may be objects of a search result, or may be objects designated by a user operating the input device 109.

Note that the "objects" above may be anything if they are observation targets of the network cameras 112, and may be people, and may be sanitation vehicles that clean within premises.

Also, in the above example, a common object is the same object, but it may not be exactly the same, and may be a partial different object. For example, respective staff who are wearing the same uniform may be made to be a common object. In such a case, in place of distinguishing people, distinguishing of whether or not the same uniform is worn is performed. In this way, an object used as a common object is something for which color correction from one to another among objects is performed, and it may be any kind of object if the objects have a predetermined correspondence relationship therebetween.

Also, in the object extraction processing, information that stipulates that a region thereof may be collected rather than extracting the object from images captured. In such a case, configuration may also be taken such that when correcting the tint of objects, the tint is corrected in the region that this information stipulates, and an image in this region is extracted after this correction, and registered in the external storage apparatus 104 as the object.

Also, in the cases where the object is a sanitation vehicle or the like, the correction parameter may be generated using the sanitation vehicle color. By using multi-colored paint on the sanitation vehicles it is possible to generate parameters that correct the tints of the same plurality of colors when using a color patch. Also it is possible to use colors of uniforms of staff. In such a case, it is unnecessary to distinguish people, and color correction is possible by determining whether or not a uniform is worn.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-208287, filed Oct. 22, 2015, which is hereby incorporated by reference herein in its entirety.

What is claimed is:

1. An image processing apparatus, comprising:
one or more processors; and
at least one memory coupled to the one or more processors, the at least one memory having instructions stored thereon which, when executed by the one or more processors, cause the image processing apparatus to:
use a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and
use, if a third object that a third image capturing device captured in a third time zone after the second time zone corresponds to the first object, a second parameter for correcting a tint of the third object to the tint of the first object that the first image capturing device captured in the first time zone, and to use, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

2. The image processing apparatus according to claim 1, wherein the at least one memory stores further instructions, which when executed by the one or more processors, cause the image processing apparatus to use, if the third object corresponds to the second object, a parameter obtained by combining the third parameter and the first parameter to correct the tint of the object that the third image capturing device captured in the fourth time zone.

3. The image processing apparatus according to claim 1, wherein the at least one memory stores further instructions, which when executed by the one or more processors, cause the image processing apparatus to:
use, if a fourth object that a fourth image capturing device captured in the third time zone corresponds to the third object, a fourth parameter for correcting a tint of the fourth object to the tint of the third object that the third image capturing device captured in the third time zone, and uses, if the third object corresponds to the first object, the second parameter, and uses, if the third object corresponds to the second object, the third parameter and the first parameter to correct a tint of an object that the fourth image capturing device captured in a fourth time zone.

4. The image processing apparatus according to claim 3, wherein the first object, the second object, the third object, and the fourth object are the same object.

5. The image processing apparatus according to claim 3, wherein the first object, the second object, the third object, and the fourth object are the partially different objects to each other.

6. The image processing apparatus according to claim 3, wherein the first time zone, the second time zone, the third time zone, and the fourth time zone are time zones arranged at regular intervals or at irregular intervals and are different time zones to each other.

7. The image processing apparatus according to claim 3, wherein the first time zone, the second time zone, the third time zone, and the fourth time zone are time zones of vicinities of timings at which a tint adjustment value exceeds a predetermined value in a case where the first image capturing device and the second image capturing device have a function for performing a tint adjustment, and are time zones that are different to each other.

8. The image processing apparatus according to claim 1, wherein the at least one memory stores further instructions, which when executed by the one or more processors, cause the image processing apparatus to register the object that was corrected using the first parameter and the object that was corrected using the second parameter.

9. The image processing apparatus according to claim 8, wherein the at least one memory stores further instructions, which when executed by the one or more processors, cause the image processing apparatus to:
   obtain a query image; and
   perform a search in relation to objects that the registered based on the query image.

10. An image processing method that an image processing apparatus performs, the method comprising:
   using a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and
   using, if a third object that a third image capturing device captured in a third time zone after the second time zone corresponds to the first object, a second parameter for correcting a tint of the third object to the tint of the first object that the first image capturing device captured in the first time zone, and using, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

11. A non-transitory computer-readable storage medium storing a computer program for causing a computer to:
   use a first parameter for correcting a tint of a second object that a second image capturing device captured in a first time zone to a tint of a first object that a first image capturing device that is a reference captured in the first time zone to correct a tint of an object that the second image capturing device captured in a second time zone after the first time zone; and
   use, if a third object that a third image capturing device captured in a third time zone after the second time zone corresponds to the first object, a second parameter for correcting a tint of the third object to the tint of the first object that the first image capturing device captured in the first time zone, and to use, if the third object corresponds to the second object, the first parameter and a third parameter for correcting the tint of the third object to the tint of the second object that the second image capturing device captured in the first time zone to correct a tint of an object that the third image capturing device captured in a fourth time zone after the third time zone.

* * * * *